Patented June 24, 1924.

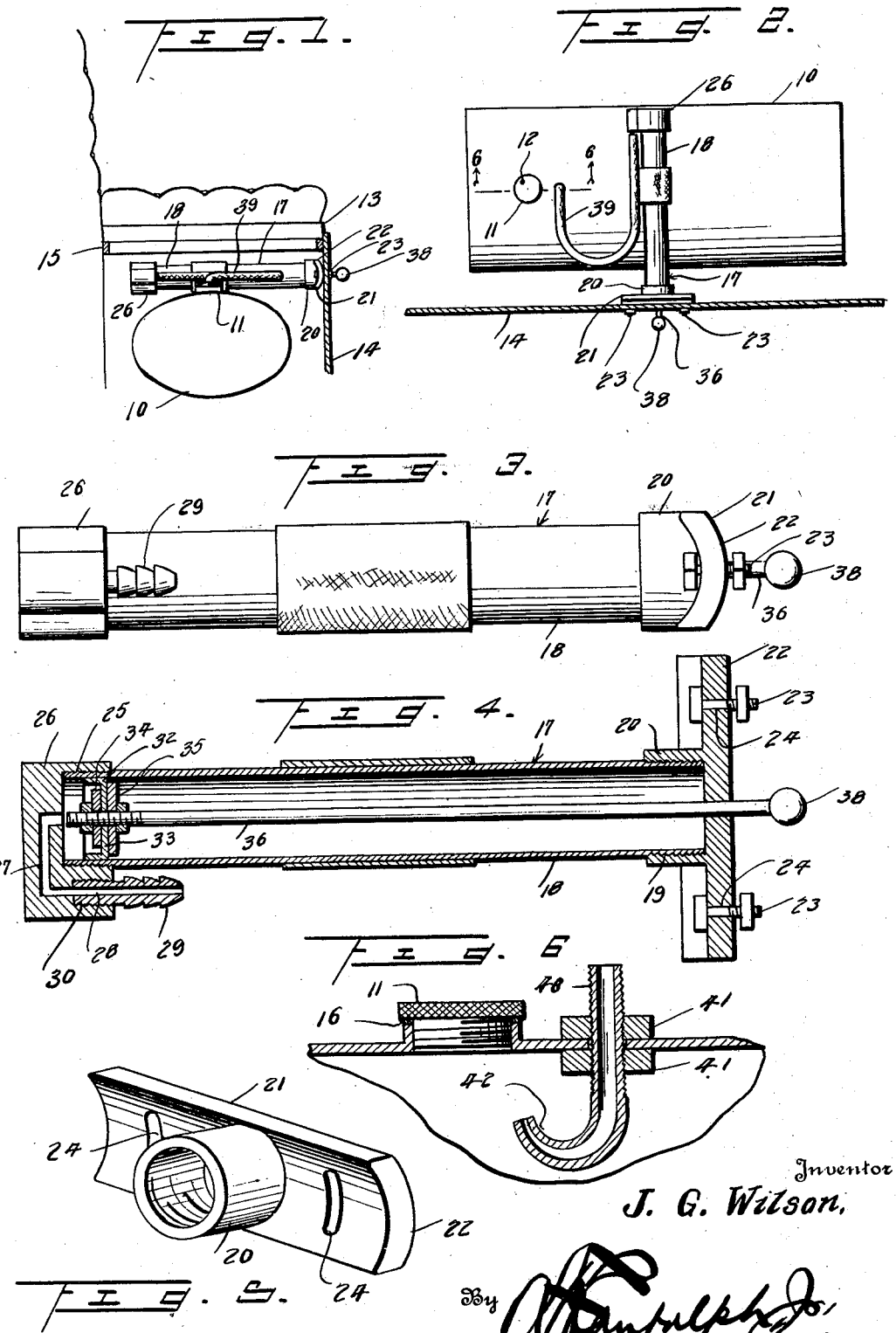

1,498,709

UNITED STATES PATENT OFFICE.

JAMES G. WILSON, OF WEEDVILLE, PENNSYLVANIA.

FUEL-TANK PRESSURE APPLIANCE.

Application filed August 28, 1923. Serial No. 659,827.

*To all whom it may concern:*

Be it known that I, JAMES G. WILSON, a citizen of the United States, residing at Weedville, in the county of Elk and State of Pennsylvania, have invented certain new and useful Improvements in Fuel-Tank Pressure Appliances; and I do hereby declare the following to be a full, clear, and exact description of the invention, such as will enable others skilled in the art to which it appertains to make and use the same.

This invention relates to a fuel tank pressure appliance and more specifically to a means operable at desired times in order to place fuel in gravity fuel feed apparatus of internal combustion engines, as on automobiles, under pressure particularly when the supply of fuel is low and the automobile is ascending grade.

Another object is to provide the appliance primarily as an air pump and to conveniently locate it on the automobile so that it may be operated easily and by one hand of the driver while the other hand is used to steer the vehicle, and while the driver remains seated.

Additional objects are to provide such a pump as is not in the way when out of use, and which does not interfere with the use of the filler cap of the fuel tank as in removing or replacing it; one that is easily operated and practically valveless and one which is of exceedingly simple construction and avoids connections likely to loosen.

An important further object is to provide a construction wherein the air pressure within the tank will automatically become normal subsequent to operation of the pump and use of the pressure produced thereby.

Various additional objects will become apparent from a consideration of the description following taken in connection with accompanying drawings illustrating an operative embodiment.

In said drawings:—

Figure 1 is a view in vertical section illustrating the invention as applied;

Figure 2 is a view illustrating the invention in plan and as operatively applied to a fuel tank and fastened to an automobile;

Figure 3 is an elevation of the pump proper;

Figure 4 is a longitudinal sectional view taken through the pump and at a right angle to Figure 3;

Figure 5 is a perspective view of the attaching head of the pump; and

Figure 6 is a detail sectional view taken on the line 6—6 of Figure 2.

Like reference characters designate like or similar parts in the different views.

Fragmentary parts of a conventional automobile whose propelling engine is supplied with fuel by gravity feed is shown in Figures 1 and 2. These parts consist of the fuel tank 10 adapted to be filled through an opening normally closed by a removable cap 11 having a relatively small vent opening 12 therethrough. This tank is disposed under a removable seat 13 of the automobile and in the rear of a front wall or apron 14 of the seat supporting frame 15. For the purposes of my improvement, the cap 11 has a gasket 16 applied between the same and its seat so that loss of pressure or air through the seat will be avoided.

In carrying out the invention, a suitable hand pump generally designated 17 is employed which is located intermediate the tank 10 and the seat 13 so as to be conveniently disposed for operation and not to form an obstruction to the use of the automobile.

Pump 17 has a cylindrical barrel 18 which is screw threaded at 19 into an extension 20 of a head 21. The surface of the head 21 which is outermost is curved or cambered as at 22 and arranged in direct engagement with the inner surface of the wall 14 and fastened against that surface by means of detachable bolts 23 which pass through transversely elongated slots 24 provided in such base. In this way, the head 21 will adapt itself to the surface of the wall 14 and may be adjustably located and attached with respect to the tank 10. At the base end, cylinder 18 is screw threaded as at 25 into a base 26 having an outlet passage 27 in communication with the outlet passage 28 of a nipple 29 screw threaded at 30 into said base 26.

Surrounding the barrel 18 at the portion thereof which rests on the tank 10 is a protecting sleeve of textile or other material which is adapted to directly engage the tank and thus prevent undue wear, noise and the production of friction which might result in sparks and a fire.

The air within the barrel 18 is compressed by a suitable piston 32 which may consist of a flexible washer or gasket 33 reinforced by disks 34 and 35 and secured to a piston or sucker rod 36 by means of nuts 37 threaded to the rod. Rod 36 slidably passes through the head 21 and wall 14 and at its distal or operating end has a ball or knob 38.

A flexible hose or conduit 39 is detachably secured to the nipple 29 and to a nipple or tube 40 which is suitably fastened by nuts 41 to the tank 10. The inner end of tube 40 is deflected upwardly as at 42 in order to prevent discharge of the air directly on the gasoline or fuel within tank 10 and which would result in the escape of vapor of a distinct gasoline odor about the filling cap 11.

Due to the particular location of the appliance directly under the driver's seat and adjacent the steering wheel, the driver may actuate the pump while seated. For instance if the automobile is ascending grade and the supply of fuel in the tank 10 is low, and the engine should balk, the operator continues to drive the automobile with one hand and with the other hand engages the knob 38 and reciprocates the rod 36 whereby air is compressed in the barrel 18 and travels therefrom through the passageways 27, 28, tube 39, nipple 40, nut 41 and connection 42 into the tank, thus placing a head of compressed air above the fuel and causing the fuel to flow therefrom to the carbureter under pressure. For this purpose, very slight pressure will suffice and the operation of the pump is very easily accomplished.

Even with the use of my improved pump, the vent 12 is not closed. Some of the air under pressure will escape through the vent 12 but as such vent is of such small size, it will not escape sufficiently fast as to destroy the utility of the pump. As the pressure is desired only for a short period of time, after the period when it is useful has expired, and operation of the pump has ceased, the pressure will gradually escape through the vent opening 12 and thus the pressure within the tank will automatically become normal.

Various changes may be resorted to provided they fall within the spirit and scope of the invention.

What is claimed is:—

1. In combination with the front wall of an automobile driver's seat, and a fuel supply tank, an air pressure pump, a head for said pump having a curved surface and elongated slots therein, said head secured to the front wall aforesaid through said slots, and means connecting the pump with the fuel tank for supplying air under pressure to the tank.

2. In combination, a fuel tank having a vent opening, a pump having a barrel disposed over the tank, a protecting sleeve of textile material surrounding the barrel and resting on the tank, a head to which the barrel is fastened having a curved surface to engage a supporting wall, said head having elongated slots, fastening means passing through said slots and said wall, a base at the opposite end of the barrel to the head, a piston operable in the barrel, a nipple secured to the base, a hose secured to the nipple, a second nipple to which the hose is secured, and said second nipple being in communication with the interior of the tank.

In testimony whereof I affix my signature in presence of two witnesses.

JAMES G. WILSON.

Witnesses:
 JEANE C. LEWIS,
 W. E. LEWIS.